United States Patent [19]

McHenry et al.

[11] 4,113,507

[45] Sep. 12, 1978

[54] METHOD OF PREPARING A SOLUTION FOR MAKING ELECTROCONDUCTIVE TIN OXIDE FILMS

[75] Inventors: Donald L. McHenry, Galion; Charles H. Bechtel, Mansfield, both of Ohio

[73] Assignee: PPG Industries, Inc., Pittsburgh, Pa.

[21] Appl. No.: 746,270

[22] Filed: Dec. 1, 1976

[51] Int. Cl.² ............................................. H01B 1/08
[52] U.S. Cl. ............................... 106/287.18; 252/518; 427/166
[58] Field of Search ............................. 252/500, 518; 106/287 R; 427/165, 166

[56] References Cited

U.S. PATENT DOCUMENTS

| | | | |
|---|---|---|---|
| 2,466,119 | 4/1949 | Moulton et al. | 427/165 |
| 2,569,773 | 10/1951 | Orr | 428/432 |
| 2,740,731 | 4/1956 | Lylle et al. | 428/336 |
| 3,762,902 | 10/1973 | Wagner et al. | 65/60 |

*Primary Examiner*—Lorenzo B. Hayes
*Attorney, Agent, or Firm*—Donna L. Seidel; E. Kears Pollock

[57] ABSTRACT

A method is provided for preparing tin oxide film forming solutions wherein a heel of prepared filming solution is maintained in a mixing vessel and ingredients for a fresh solution are added thereto so that the viscosity of the solution is kept sufficiently low to improve mixing rates and with the effect that fuming and volatilization of the solution is substantially reduced during mixing.

3 Claims, No Drawings

METHOD OF PREPARING A SOLUTION FOR MAKING ELECTROCONDUCTIVE TIN OXIDE FILMS

BACKGROUND OF THE INVENTION

1. Field of the Invention

This invention relates to the preparation of transparent electroconductive articles by the application of tin oxide film forming compositions to glass or ceramic substrates and, in particular, relates to a novel method for the preparation of such tin oxide film forming compositions.

2. Brief Description of the Prior Art

It is well known that transparent, electroconductive films may be deposited upon refractory bases or substrates, such as glass, by heating substrate surfaces to elevated temperatures or maintaining them at elevated temperatures following formation and contacting the hot substrate surfaces with tin oxide film forming compositions. Typical tin oxide film forming compositions are solutions or mixtures containing tin compounds which are readily decomposed due to heat, particularly in an oxidizing environment, to form tin oxide films. Both organic and inorganic tin compounds have been employed to provide a source of tin and such tin oxide film forming compositions. According to the teachings of U.S. Pat. No. 3,107,177 to Saunders and Wagner, film forming compositions may include organic tin compounds, such as dibutyl tin diacetate, along with a souce of fluorine, such as hydrofluoric acid, for improving the electroconductivity of films produced due to the inclusion of fluorine in those films. That patent further discloses that various organic solvents and solvating agents may be used in preparing such film forming compositions.

In a typical method for preparing tin oxide film forming compositions, a tin-containing compound, such as dibutyl tin diacetate, is first placed in a mixing container. To the dibutyl tin diacetate in the mixing container is added a solution or mixture of hydrofluoric acid in an organic solvent, such as methanol. Typically, a 30 percent hydrofluoric acid-methanol solution may be slowly added to the mixing container containing dibutyl tin diacetate with continuous or intermittent stirring. During the blending of these two ingredients, a semi-solid mixture results which has a granular texture with a consistency much like cottage cheese. While these ingredients are in this semi-solid stage, mixing is continued to insure adequate blending. Mixing of such a semi-solid, highly viscous composition requires expenditure of considerable effort. Following the blending of these two ingredients, a quantity of solvating agent, such as triethylamine, is slowly added to the semi-solid mixture in the mixing container and mixing is continued. During this mixing step, the ingredients react exothermically, generating considerable heat, causing the mixture to boil vigorously and at times producing heavy, white fumes and a noticeably heavy foam on the surface of the mixture. Of course, the mixing necessarily takes place in a vented space under a hood in order to maintain safe and healthy conditions for those individuals preparing such a mixture. Typically, more than 10 percent of the ingredients are lost due to vaporization and fuming during this mixing step.

The present invention contemplates a method for improved mixing of ingredients of a tin oxide film forming composition.

SUMMARY OF THE INVENTION

According to this invention, a heel or starter batch of a prepared tin oxide film forming composition is maintained for use during the mixing of subsequent batches of similar composition. The mixing procedure employed comprises maintaining or placing a heel or starter batch of mixed tin oxide film forming composition in a mixing container and adding individual ingredients to that first volume of the composition in amounts to prepare a total volume or amount of the composition, including the starter batch, that is, on the order of from two to three times the volume of the starter batch.

The steps of preparing a tin oxide film forming composition according to this invention are as follows: A starter batch or heel of prepared tin oxide film forming composition is placed or maintained in a mixing container. To this starter batch is added a tin-containing compound. The tin-containing compound is added slowly to the starter batch in the mixing container. It is added slowly and is added as stirring or mixing is preferably carried out. No chemical reaction or other physical change is observed during this step of the process other than the volume increase due to the addition of the tin-containing compound to the starter batch. Next, a flourine-source compound is slowly added to the mixture in the mixing container. Typically, hydrofluoric acid in an organic solvent, such as methanol, is added. During this addition the only noticeable change in the mixture, other than volume increase, is that the total mixture becomes milky-white in appearance with an apparent slight viscosity increase to a creamy consistency. The mixture is easily subjected to stirring during the addition of the hydrofluoric acid and organic solvent composition. Finally, a solvating agent, such as triethylamine, is slowly added to the mixture in the mixing container while it is stirred. During the final mixing step, there is some evidence of exothermic reaction and a small amount of boiling occurs. No visible evidence of fuming occurs and there is no visible evidence of heavy foaming appearing on the surface of the mixture.

During the entire mixing procedure, the mixture maintained in the mixing container is easily stirred as its viscosity never increases to an unsatisfactory level at which mixing becomes difficult or requires excessive effort.

While it is desirable to carry out the present mixing procedure under a ventilated hood in order to maintain adequate safety and health conditions for workers preparing such mixtures, there is a significant reduction in volatilization and fuming compared to known mixing procedures as no apparent fuming takes place. At least a 10 percent reduction in material loss occurs compared to the loss occurring incidental to the previously employed mixing procedure.

Several benefits accrue from practicing the present method of preparing tin oxide film forming compositions. Both safety and health conditions surrounding the preparation of such compositions are improved by the present method. The viscosity of the mixture maintained in a mixing container is kept low as evidenced by the fact that the mixture retains a clearly fluid characteristic, rather than being semi-solid. Because the viscosity of the mixtures is kept low, it is possible to carry out mixing at approximately twice the rate as possible using the previously known method. This is observed, for example, in preparing a new quantity of tin oxide film forming composition in approximately half the time required to prepare such a new quantity of similar composition according to the previously known mixing procedure. Because the mixtures encountered in the present procedure are fluid at all stages, the present method readily lends itself to automated mixing procedures whereas the prior method does not. The presently disclosed method of mixing tin oxide film forming compositions reduces the amount of potential atmospheric pollution that could result from a discharge of fumes from a ventilated hood area at which such compositions are prepared. Finally, a noticeable cost savings is achieved in preparing tin oxide film forming compositions according to this method, rather than the method employed in the past, since there is a savings of a least about 10 percent of the total volume of the ingredients for each new quantity of film forming composition prepared.

This invention may be further appreciated with reference to the following specific example: A starter batch of tin oxide film forming composition is added to or maintained in a stainless steel mixing container located beneath an exhaust hood. A preferred mixing container is one lined with an inert plastic liner such as fluorinated hydrocarbon, for example, those sold under the trademark TEFLON. A container suitable for preparing and containing up to at least about 20 gallons of material is employed, and a starter batch of about 5 gallons of material (approximately 20 liters) of film forming composition is provided in a mixing container. About 9.46 liters of dibutyl tin diacetate is gradually added to the starter batch in the mixing container while stirring the mixture. Next, about 7.95 liters of 30 percent hydrofluoric acid in methanol is slowly added to the mixture in the mixing container. During this addition the mixture becomes somewhat more viscous and has a creamy consistency as it is either continuously or intermittently stirred. Next, 7.2 liters of triethylamine is slowly added to the mixture in the mixing container. There is some boiling observed at the surface of the mixture but no apparent visible fuming. When the mixing is complete, from five to six gallons (20 to 25 liters) of tin oxide film forming composition is removed from the mixing container for use in making transparent, electroconductive films on glass or other substrates according to the teachings of U.S. Pat. No. 3,107,177 which is incorporated herein by reference. The remainder of the composition is allowed to remain in the mixing container to be used as a starter batch for preparation of the next batch of tin oxide film forming composition.

The present invention is considered applicable to the preparation of film forming or coating compositions, such as those described in U.S. Pat. No. 3,762,902, which is incorporated by reference herein to disclose a practical use of such coating compositions to make coated glass articles for use as windows in stationary structures and in mobile vehicles of all kinds.

The present invention is considered applicable to the preparation of any tin oxide film forming composition wherein a tin-containing compound is to be mixed with a solvating agent and a strong acid to prepare a tin oxide film forming composition. For example, the invention is believed applicable to the preparation of tin oxide film forming compositions comprising such tin-containing compounds as dibutyl tin diacetate, dibutyl tin oxide, tributyl tin oxide, dibutyl tin dilaurate, tributyl tin acetate, dibutyl tin maleate, dibutyl tin di 2-ethyl hexoate, stannous acetate, stannous octoate, dibutyl tin difluoride, tin halides and other tin salts or any tin compound which is suitable for forming tin oxide on a substrate when subjected to sufficient heat for decomposing the tin compound in the presence of the substrate.

The present invention is believed applicable to the preparation of compositions containing mineral acids other than hydrofluoric acid and particularly applicable to the preparation of compositions containing hydrochloric acid. The invention is believed applicable to the preparation of solutions containing any convenient or organic solvent, such as, for example, alcohols, ketones, non-polar organic solvents, such as benzene, toluene or the like. The preferred solutions contain a lower alkylamine, such as trimethylamine, triethylamine, dimethylethylamine or ethylamine. Other amines, such as ethanolamine, may also be present.

Further, this invention is applicable to the preparation of film forming compositions containing metal dopant for improving the electroconductivity of tin oxide films such as compositions containing indium or antimony compounds.

While this invention has been described with particular reference to specific embodiments, those skilled in the art will recognize that the advantages of this invention may be employed for other embodiments not specifically disclosed here but nevertheless taught by the generic teachings of this disclosure and embraced by the appended claims.

We claim:

1. In a method of preparing a tin oxide film forming composition by combining a tin compound which is decomposable at elevated temperatures for depositing a film on a substrate, a fluorine-containing compound and an organic solvent and an amine wherein the composition is subject to volatilization during mixing, the improvement comprising:
   establishing a volume of the prepared tin oxide film forming composition in a container for use as a starter batch, and
   preparing subsequent batches of tin oxide film forming composition by adding the tin compound, the fluorine-containing compound and the amine as separate ingredients to the volume of prepared tin oxide film forming composition while mixing, wherein the added ingredients are in amounts sufficient to provide a final volume of the tin oxide film forming composition that is from two to three times the volume of the first volume, whereby volatilization from the composition is substantially eliminated.

2. The method according to claim 1 wherein the added ingredients are added in the order of, first, adding the tin compound as an organic tin compound, second, adding the fluorine-containing compound as hydrofluoric acid in an organic solvent and, third, adding the amine.

3. The method according to claim 1, wherein a portion of the final volume is maintained to be used as the starter batch for subsequent batches.

* * * * *